US008346644B2

United States Patent
Reiss

(10) Patent No.: US 8,346,644 B2
(45) Date of Patent: Jan. 1, 2013

(54) METHOD AND SYSTEM FOR RECONCILING EQUITY HEDGE FUNDS

(75) Inventor: Paul Reiss, West Caldwell, NJ (US)

(73) Assignee: The Hartford Fire Insurance Company, Hartford, CT (US)

( * ) Notice: Subject to any disclaimer, the term of this patent is extended or adjusted under 35 U.S.C. 154(b) by 591 days.

(21) Appl. No.: 12/539,934

(22) Filed: Aug. 12, 2009

(65) Prior Publication Data
US 2009/0299915 A1 Dec. 3, 2009

Related U.S. Application Data

(63) Continuation of application No. 10/066,120, filed on Jan. 31, 2002, now Pat. No. 7,606,754.

(60) Provisional application No. 60/266,574, filed on Feb. 5, 2001.

(51) Int. Cl.
*G06Q 40/00* (2012.01)

(52) U.S. Cl. ............................ 705/36 R; 705/35; 705/37

(58) Field of Classification Search ...................... 705/35
See application file for complete search history.

(56) References Cited

U.S. PATENT DOCUMENTS

| | | | |
|---|---|---|---|
| 4,969,094 A | 11/1990 | Halley et al. | |
| 5,806,042 A | 9/1998 | Kelly et al. | |
| 5,926,792 A | 7/1999 | Koppes et al. | |
| 5,999,917 A | 12/1999 | Facciani et al. | |
| 6,049,772 A | 4/2000 | Payne et al. | |
| 7,149,713 B2 | 12/2006 | Bove et al. | |
| 2002/0013751 A1 | 1/2002 | Facciani et al. | |
| 2002/0188540 A1 | 12/2002 | Fay et al. | |
| 2003/0083972 A1 | 5/2003 | Williams | |
| 2003/0105652 A1 | 6/2003 | Arena et al. | |
| 2004/0019506 A1 | 1/2004 | Struchtemeyer et al. | |
| 2004/0078244 A1 | 4/2004 | Katcher | |
| 2004/0177021 A1 | 9/2004 | Carlson et al. | |
| 2004/0177022 A1 | 9/2004 | Williams et al. | |
| 2005/0010453 A1 | 1/2005 | Terlizzi et al. | |
| 2005/0131798 A1 | 6/2005 | Eisler et al. | |

OTHER PUBLICATIONS

Carrick, Gregory, Analyzing the financing of nonqualified deferred compensation plans, Benefits Quarterly, 1998, p. 43-58, v14, n3.
Kuehner-Herbert, Katie, Human Resources: Exec Compensation: Pay Now or Pay Later? (Humbolt Bancorp.), American Banker, Jul. 18, 2001, p. 6, v.166, n137. Reich-Hale, David, MetLife Unit to Help Sell Exec Retirement Plans, American Banker, Dec. 14, 2000, p. 8, v165, n239.
Office of the Comptroller of the Currency, Administrator of National Banks, OCC Bulletin, Jul. 20, 2000, p. 2000-2023.

*Primary Examiner* — Charles Kyle
*Assistant Examiner* — Seth Weis
(74) *Attorney, Agent, or Firm* — Howard IP Law Group, PC

(57) ABSTRACT

A method and system for tracking the compliance of a portfolio account used to finance benefit obligations containing a plurality of assets distributed among at least one fund category, containing at least one investment vehicle such as cash, stocks, bonds, insurance policies, is disclosed. The method monitors the balance of assets included in selected investment vehicles, e.g., stocks, equities and relates them to new or modified liability allocations. The method identifies a liability balance associated with selected ones of the investment vehicles within each of the fund categories, identifies an asset balance associated with the value of equities in the account and divests a portion of selected investment vehicles when the asset balance is in violation of a known regulation with regard to the liability balance. The method further provides an indication for reporting when the asset balance is within the known relation to the liability balance as required by appropriate regulations.

21 Claims, 7 Drawing Sheets

600

| | Total Equity | Large Cap Equity | Small Cap Equity | International Equity | Peer Group Equity |
|---|---|---|---|---|---|
| Opening Liability Balances | | | | | |
| NQ Deferred Compensation | 11,250,000 | 8,000,000 | 2,000,000 | 250,000 | 1,000,000 |
| Supplemental Executive Retirement | 2,200,000 | 2,000,000 | 50,000 | 50,000 | 100,000 |
| Total Opening Balance | 13,450,000 | 10,000,000 | 2,050,000 | 300,000 | 1,100,000 |
| Changes in Balances, this period | | | | | |
| New Equity Deferrals | 650,000 | 500,000 | 100,000 | — | 50,000 |
| Distributions/Payouts | (3,225,000) | (3,150,000) | — | — | (75,000) |
| New Reallocations of Existing Deferrals | 67,500 | (1,250,000) | 1,250,000 | — | 67,500 |
| Assumed Investment gain (loss) | — | | | | |
| Total Changes in Balances | (2,507,500) | (3,900,000) | 1,350,000 | — | 42,500 |
| Current Equity Liability Balance | 10,942,500 | 6,100,000 | 3,400,000 | 300,000 | 1,142,500 |
| | | | | | |
| Bank Owned Assets | | | | | |
| Current Value of Mutual Fund Equity Positions | 4,275,070.00 | 2,675,000.00 | 500,070.00 | 0.00 | 1,100,000.00 |
| Current Value of Insurance Investment Equity | | | | | |
| VG 01234 | 2,000,000.00 | 2,000,000.00 | — | 0.00 | 0.00 |
| IV 93876 | 4,275,000.00 | 4,250,000.00 | — | 25,000.00 | 0.00 |
| Total Hedge Balance (Funds and Insurance) | 10,550,070.00 | 8,925,000.00 | 500,070.00 | 25,000.00 | 1,100,000.00 |
| | | | | | |
| Is the Equity Hedge Compliant? | Compliant | Not Compliant | Compliant | Compliant | Compliant |

METHOD AND SYSTEM FOR RECONCILING EQUITY HEDGE FUNDS

CROSS-REFERENCE TO RELATED APPLICATION

This application is a continuation application of co-pending U.S. patent application Ser. No. 10/066,120 entitled METHOD AND SYSTEM FOR RECONCILING EQUITY HEDGE FUNDS, filed Jan. 31, 2002, which claims the benefit under 35 U.S.C. 119 (e) of U.S. Provisional Application Ser. No. 60/266,574, filed Feb. 5, 2001, the entire contents of all of which are herein incorporated by reference.

FIELD OF THE INVENTION

The present invention relates to methods of tracking investments and more specifically to determining equity-based investments subject to U.S. Government regulations of financial institutions.

BACKGROUND OF THE INVENTION

The collapse of the equity markets in 1929 caused the failure of many banking institutions that invested heavily in the equity markets. Laws enacted by the U.S. Congress after the equity market collapse prevented banks from investing in the equity or stock market, The Security Exchange Commission Act of 1934 and Glass-Stegall Act of 1934, for example, placed the stock markets and many banking institutions under the regulatory administration of the Security Exchange Commission, The Office of the Comptroller of the Currency, The Office of Thrift Supervision, and the Federal Reserve Bank. The purpose of these administrative acts was to prevent banking institutions from investing in equities and preclude a similar failure of banks or financial institutions from over-investing in questionable or risky equities. However, a disadvantage of preventing banking financial institutions from investing in equities or stocks is that banking institutions cannot take advantage of significant upswings in the equities markets to meet obligations, such as employee benefit plans. Between 1970 to 2000, many employers, including banking institutions, instituted deferred compensation programs in which employees would agree to voluntarily defer the receipt of a portion of their compensation. The employer would agree to credit an "interest" on this deferred compensation based on an outside index, such as the prime rate, or a stock market index. A banking institution then becomes liable to its employees who have preferred to defer compensation for a future payment based in part on an increase in a stock index. However, a banking institution is prohibited from owning stocks to hedge its exposure for these future payments. Thus, as the stock market activity during the latter half of the 1990's provided significant growth in funds invested in equities, the banking institutions were precluded from participating in this growth and the monies under their control could not accumulate at a similar rate.

To remedy this inequity imposed on the banking institutions, The Office of the Comptroller of the Currency (OCC) altered the limitations of the Glass-Stegall Act to afford national banking institutions a limited ability to invest in stocks or equities to increase the value of portfolios used to finance certain employee benefit liabilities commensurate with the increase in the equity markets. However, the OCC Bulletin 2000-23 imposes restrictions and reporting regulations upon the banking institutions to safeguard against over-investing in stocks or equities beyond those amounts needed to hedge liabilities or obligations undertaken. In order to meet the reporting regulations, banking institutions must constantly monitor the accounts or account portfolios they manage and declare their compliance to OCC regulations on a regular basis. Banking institutions are subject to significant monetary penalties for failure to comply with the imposed restrictions and reporting requirements. Similar regulations apply to institutions regulated by The Office of Thrift Supervision.

Hence, there is a need for a system that monitors and reconciles the value of capital, funds, assets, or monies banking institutions have invested in equities and their equity linked obligations to insure compliance with imposed restriction and reporting requirements.

SUMMARY OF THE INVENTION

A method and system for tracking compliance requirements imposed on a portfolio account containing a plurality of assets distributed among at least one investment fund category, containing at least one investment vehicle is disclosed. The method identifies a liability balance associated with selected ones of the investment vehicles within each of the fund categories, identifies an asset balance associated with the account and, when necessary, divests a portion of selected investment vehicles when the asset balance is in violation of a known relation with regard to the liability balance. The method provides an indication when the asset balance is within a known relation to the liability balance. In one aspect, the method provides a report of an asset balance, a liability balance and the determined indication.

BRIEF DESCRIPTION OF THE DRAWINGS

In the drawings:

FIG. 6 illustrates an example for determining compliance in accordance with the principles of the present invention.

Figure 1:
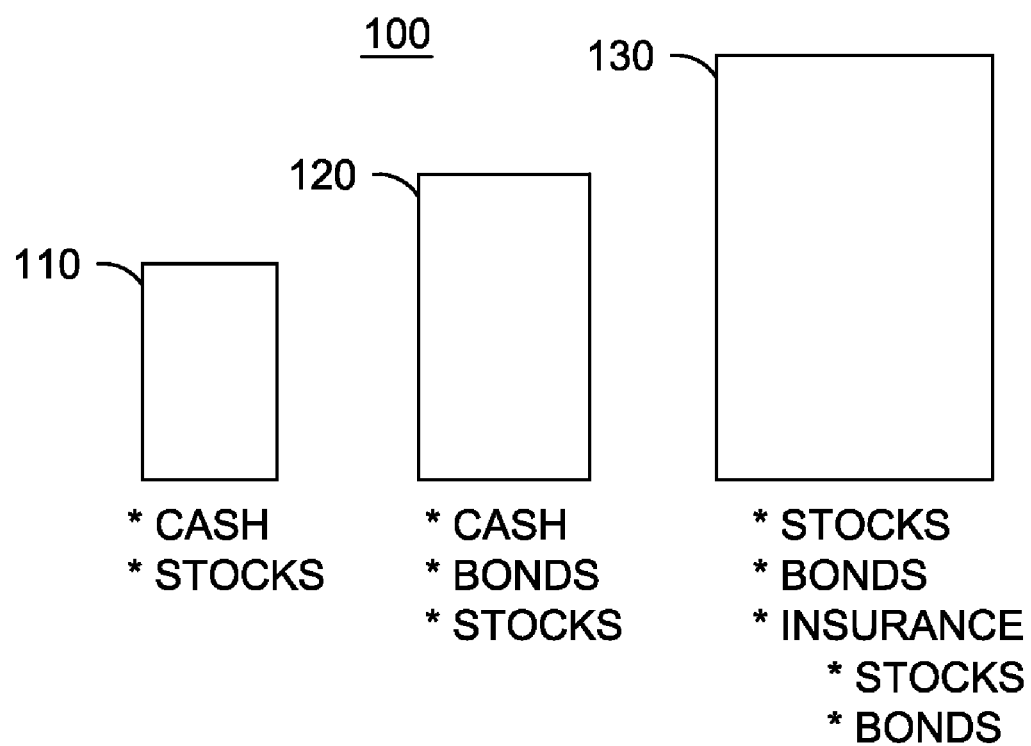
FIG. 1 illustrates a conventional distribution of funds in a managed fund.

It is to be understood that these drawings are solely for purposes of illustrating the concepts of the invention and are not intended as a definition of the limits of the invention. It will be appreciated that the same reference numerals, possibly supplemented with reference characters where appropriate, have been used throughout to identify corresponding parts.

DETAILED DESCRIPTION OF THE INVENTION

FIG. 1 illustrates one example of a conventional account or portfolio management philosophy 100. In this conventional management philosophy 100, deferred compensation funds, assets or monies invested by participating parties are allocated between three broad fund categories: short-term 110, mid-term 120 and long-term 130. Short-term 110 fund categories are those categories that are anticipated by the portfolio manager to be needed in a relatively short-term, e.g., 1-3 years. These funds, assets or monies are maintained in readily available investment vehicles, such as cash, stocks, equities or other liquid assets. Mid-term 120 fund categories are those categories in which the portfolio manager anticipates that the funds, assets or monies contained therein are to be needed in a slightly longer period, e.g., 4-8 years. These funds, assets or monies are maintained in semi-liquid investment vehicles, such as equities, short-term municipal or corporate bonds, etc. Long-term 130 fund categories are those categories in which the portfolio manager anticipates the funds, assets or monies contained therein are not needed for a significantly longer period of time, e.g., greater than 8 years. In this case, these funds, assets or monies are invested in long-term investment vehicles, such as corporate bonds, mutual funds, insurance policies, etc.

As would be appreciated, insurance policies provide significant advantages for portfolio management performance, as proceeds of insurance distributions are not taxed and consequently increase the net return on an investment. However, investment in insurance policies has disadvantages as the assets contained the insurance polices or in insurance policy funds are not readily available. These assets are only available after a fixed time period or the demise of the insured party. Secondly, insurance policies or insurance policy funds may also be invested in stocks or equities. Thus, investment in insurance policies or insurance policy funds further increases the exposure of long-term assets to value changes and fluctuations and must be accounted for to comply with government regulations.

Figure 2:
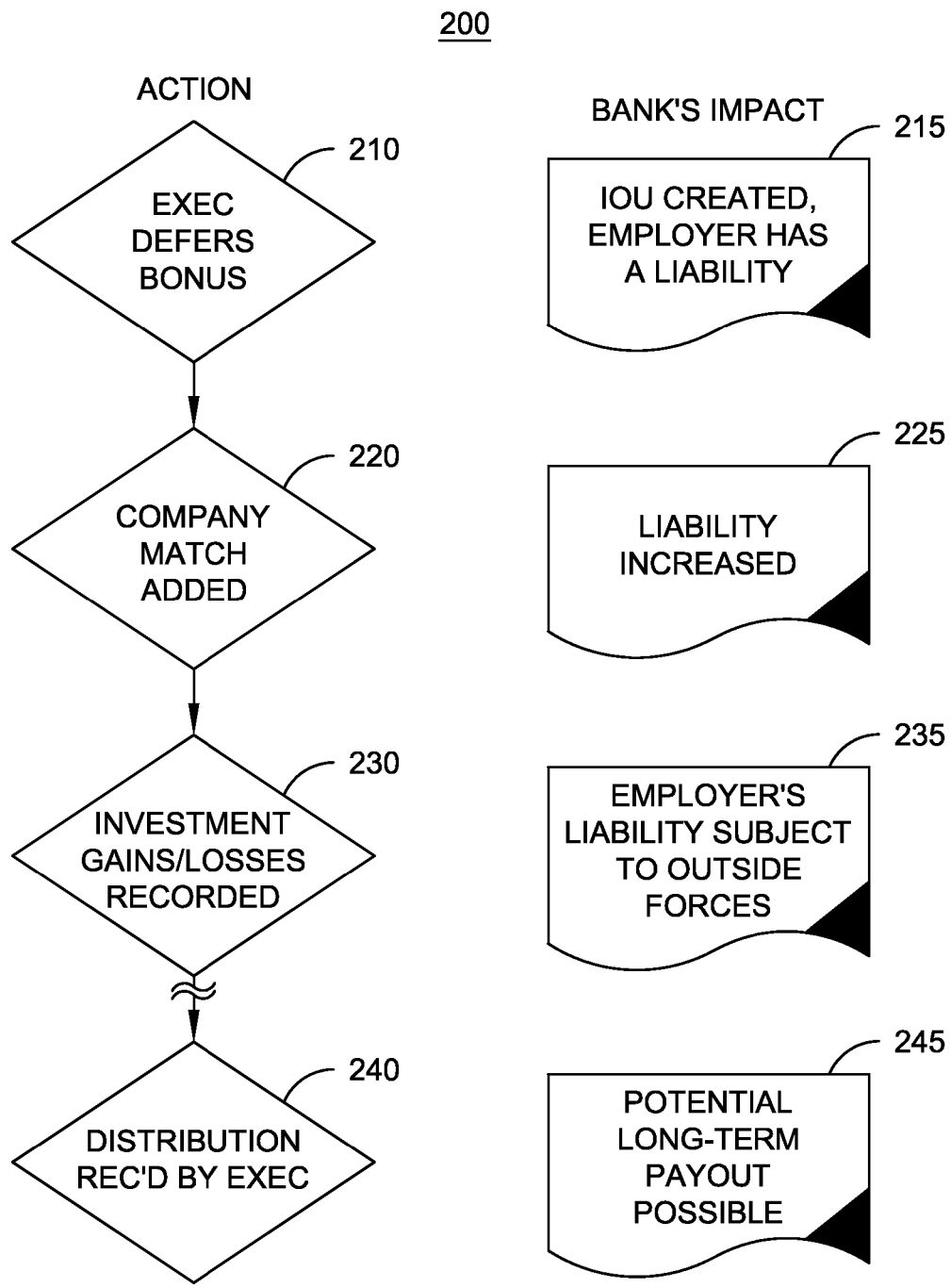
FIG. 2 illustrates an exemplary interaction between a participating party and a fund manager as viewed by the participating party.

FIG. 2 illustrates an exemplary interaction 200 between a participating party and a managed portfolio as viewed by the participating party. In this exemplary interaction, a participating party defers receiving an obligation owed at block 210. In one case, a party may elect to defer a salary payment or a bonus payment to avoid paying income taxes at a current tax rate. The salary or bonus payment funds or monies may then be placed in an account in a managed portfolio for payment at a future date. A deferred obligation is thus created within the managed portfolio at block 215 that imposes upon the managed portfolio a liability to the participating party.

Matching funds, assets or monies may also be provided by the company, employer or banking institution for all or a part of the participating party's deferred payment, at block 220. Matching funds, assets or monies may be in the form of company stock, equity, bonds, etc. The obligation or liability imposed on the managed portfolio or account to the participating party is thus increased to credit the matched funds, assets or monies at block 225. Investment gains (and losses) of the deferred and matching funds, assets or monies are next reported to the participating party at block 230. The increase or decrease in the portfolio's obligation or imposed liability to the participating party is then determined at block 235 based on the contributions made by the party and employer and the investment gains or losses.

At a future payout date, a distribution of the accumulated deferred and matched funds, assets or monies and investment gains and losses, is received by the participating party, at block 240. The distribution may, for example, be a single payment or may be distributed over a series of payments. In this latter case, the managed portfolio is obligated to maintain the account balance and provide a structured long-term distribution to the participating party.

Figure 3:
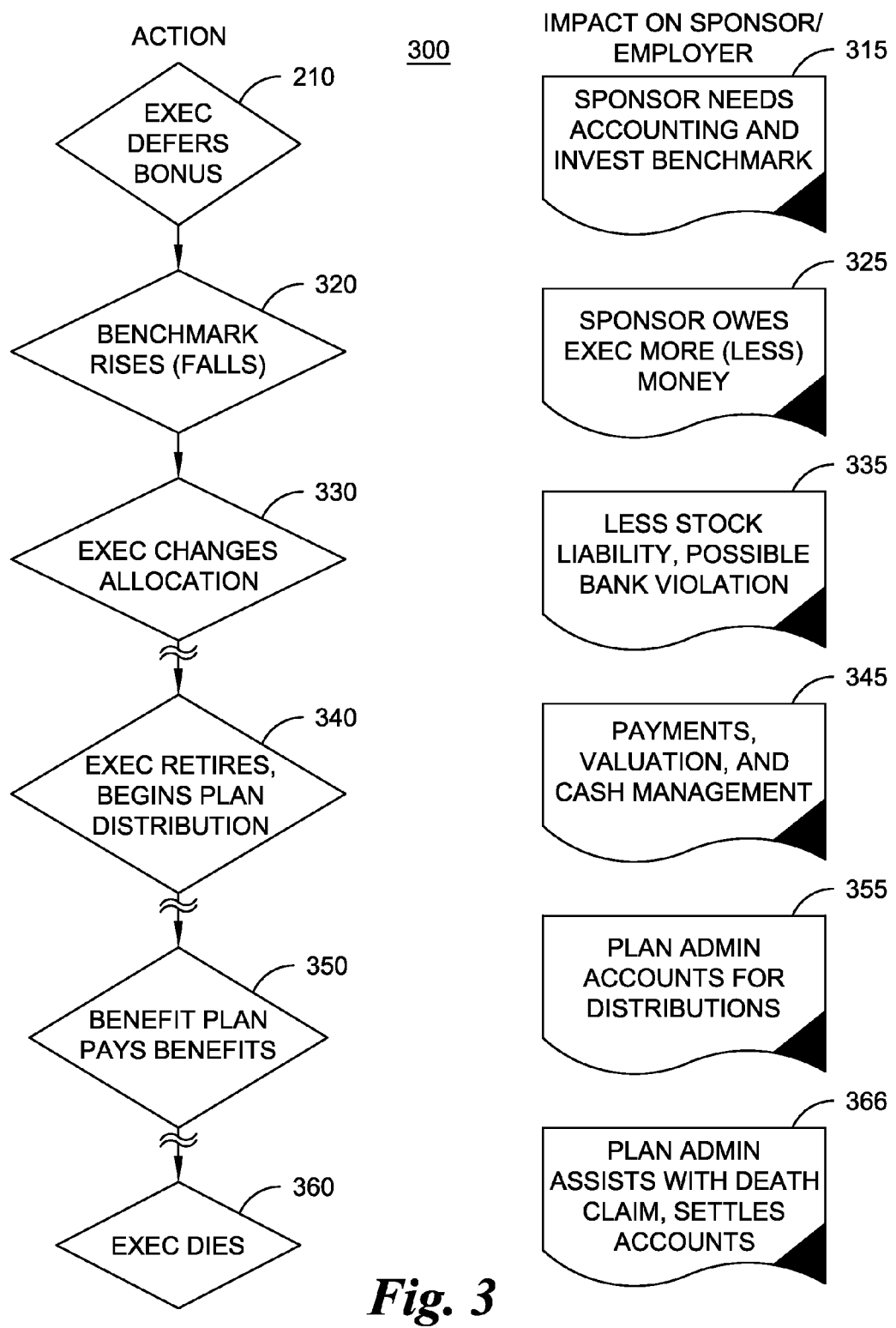
FIG. 3 illustrates the exemplary interaction illustrated in FIG. 2 as viewed by a fund manager.

FIG. 3 illustrates an exemplary interaction 300 between a participating party and a managed portfolio as viewed by the portfolio manager. In this exemplary interaction, a participating party elects to defer an obligation owed at block 210. At block 315, a plan sponsor, such as an employer, requires the portfolio manager provide an accounting of the account including investment benchmarks, i.e., contributions, gains and losses, in order to determine the value of any matching contributions that the employer may provide. At block 320, the participating party's investment benchmarks are recorded. Concurrently, the sponsor's obligation to the portfolio is determined in response to the benchmark gains or losses at block 325. At block 330, the participating party may elect to change the allocation or distribution of current deferred and invested funds, assets or monies. In response to a change in allocation of deferred funds, assets or monies, the portfolio manager must reallocate equity assets in the managed fund to avoid violation of imposed requirements of OCC 2000-23. The portfolio manager may elect to sell selected stocks or equities in order to divest the portfolio of a portion of equities such that the asset/liability relation of the portfolio is returned to a compliant value.

At block 330, a distribution of the accumulated funds, assets or monies, matching funds, assets or monies and investment gains and losses begins. In this illustrated example, evaluation of the value of the participating party's account is performed and a payment schedule is developed at block 345. At block 350, distribution payments are received by the participating party, and at block 355, accounting of the distributed payments is maintained. When the invested funds are further invested in an insurance policy, then the portfolio manager must continue to meet payment obligations even though the proceeds of the insurance policy are not yet available. In such a case, upon the death of the participating party, at block 360, an accounting and settlement of the participating party's account is performed by the portfolio manager, at block 365, to include proceeds of the insurance policy.

Figure 4:
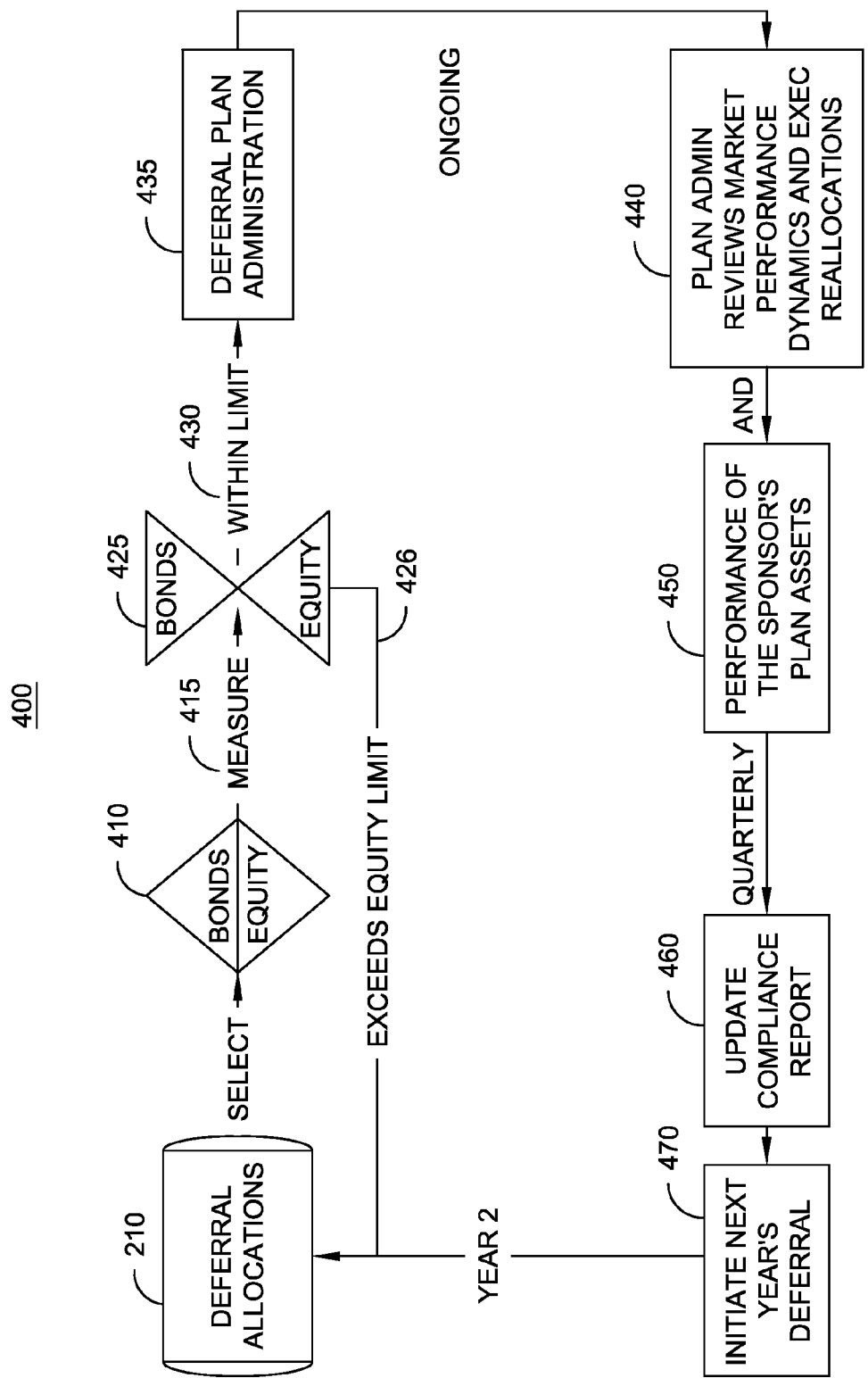
FIG. 4 illustrates a block diagram of an exemplary process flow in accordance with the principles of the invention.

FIG. 4 illustrates a block diagram of an exemplary process flow 400 of portfolio management in accordance with the principles of the invention. In this exemplary processing 400, a participating party elects to defer an asset owed, at block 210. At block 410, the deferred asset is allocated among investment vehicles, such as cash, equities, stocks and/or bonds. The party's current investment allocation is then evaluated to insure compliance with current regulations. If the allocation causes the account to be non-compliant, i.e., not within predetermined limits or a known relation, then a record of this is made and provided to the portfolio manager or plan administrator. Otherwise, the participating party's allocation is recorded with the plan administration or portfolio manager at block 435. At block 440, the plan administrator or portfolio manager reviews the performance and dynamics of the stock, bond or commodity markets and reallocates assets within the portfolio or account accordingly. At block 450, the performance of the sponsor's funds, assets or monies is evaluated. At block 460, an indicator is set to indicate that the managed portfolio supporting the participating party's account is within a known relation and, hence, in compliance. A compliance report may then be prepared responsive to the indicator. As would be appreciated, the compliance report may be displayed on a viewing device, such as a computer monitor, or may be recorded on a printer or entered into an accounting ledger. At block 470, an evaluation of the next year's deferral is performed.

Figure 5:
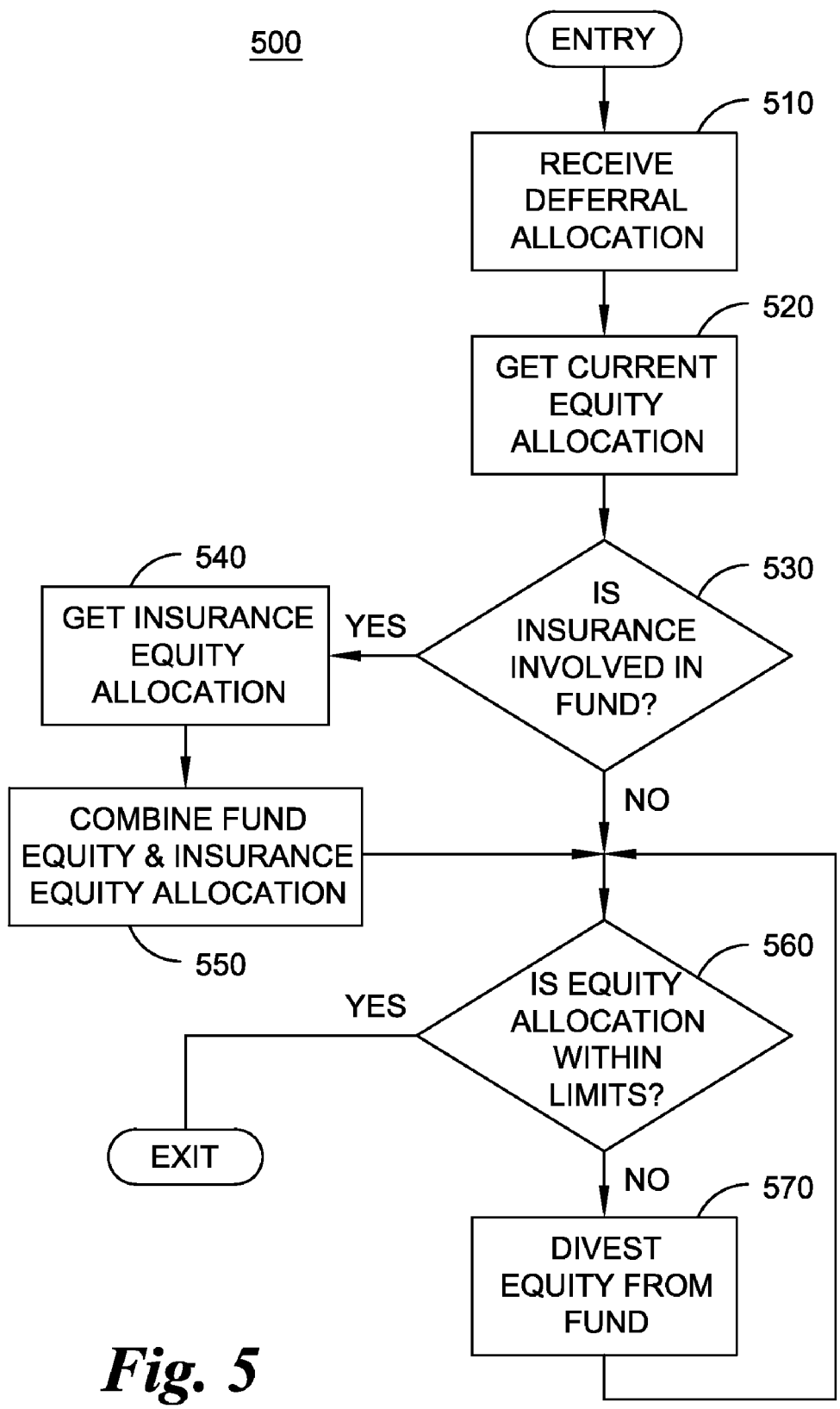
FIG. 5 illustrates a flow chart of an exemplary process in accordance with the principles of the invention.

FIG. 5 illustrates a flow chart 500 of an exemplary process in accordance with the principles of the present invention. In this illustrative process, a participating party's bond and stock allocation of deferred funds, assets or monies is received at block 510. The current equity/stock allocation, distributed over short-, mid- and long-term fund categories of the managed portfolio associated with the participating party is obtained at block 520. At block 530, a determination is made whether insurance proceeds are included in the managed portfolio's allocation. If the answer is in the affirmative, then the value of the equity assets in the insurance process is obtained at block 540. The value of equity assets allocated among the fund categories and insurance allocation are then combined to create a single value of equity assets at block 550.

At block 560, a determination is made whether the value of equity assets is within a known relation with regard to the value of the portfolio's liability to the participating party. The known relation may be set by regulatory limits or may be self-imposed by the portfolio manager, plan administrator, sponsor, etc., to further limit any risk in market fluctuation or conform to the regulatory limits. If the answer at block 560 is in the affirmative, then the process is completed and an indication of compliance (not shown) is provided to the portfolio manager, plan administrator, or sponsor. A compliance report (not shown) may then be prepared in response to the indication of compliance. As would be appreciated, a report of non-compliance may similarly be prepared when an indication of compliance is lacking.

However, if the answer at block 560 is in the negative, then a divestment of equity shares from the portfolio is necessary. The portfolio manager may initiate a process of equity divestment from the current account. The process of equity divestment may continue until the value of the equity assets is within limits with regard to the portfolio's obligations or imposed liability. In one aspect of the invention, a portfolio is compliant, or within limits, when the value of assets or equities is less than the obligations owed or imposed liabilities. In a preferred aspect of the invention, the portfolio is in compliance when the value of equity assets is equal to the value of obligations owed.

FIG. 6 illustrates an example of summary 600 of a reconciliation process of a managed long-term fund category in accordance with the principles of the present invention. Although FIG. 6 illustrates the reconciliation of an exemplary long-term fund category, one skilled in the art would easily understand that the principles of the invention may be adapted to reconcile similarly allocated mid-term fund category and short-term fund category investments, when such reconciliation is needed or necessary. In this illustrative example, a liability balance of the long-term fund category is shown to be $13,450,000.00. Also shown is a negative change in the value of the investment of $2,507,550.00 has occurred during the reporting period. The balance of imposed liability on the fund category is next determined as the sum of the current balance and the change in investment. In this case, the balance of the imposed liability is represented as $10,942,500.00. As would be appreciated, any reporting period may be selected as any suitable period such as, a week, a month, a quarter, a year, etc.

The value of assets subject to impose regulation is next determined as those investment vehicles containing stocks or equities. In this example, the value of equities in a mutual fund investment vehicle is shown to be $4,275,070.00. Further, the value of assets held in stocks or equities held in any insurance policies or insurance policy funds must be accounted. In this case, the value of stocks in the two illustrated insurance policies or insurance policy funds, represented as VG01234 and IV 93876, which are shown as $2,000,000.00 and $4,275,000.00, respectively, must be included. Accordingly, the accumulated value of assets in the exemplary long-term fund category subject to imposed regulations is $10,550,070.00.

In this case, the value of the liabilities owed by the long-term fund category is greater than the value of the equity asset. Accordingly, the fund is in compliance with the imposed regulation when the imposed regulation requires that the value of liabilities owed be greater than the value of assets subject to regulation, i.e., Liability/Asset >=1. An indication of compliance may then be provided to the portfolio manager, plan administrator or sponsor. Similarly, a report of non-compliance may be prepared when the indication of compliance is lacking. Although it may be read as a positive indication of compliance, it would be well within the knowledge of those skilled in the art, and hence contemplated as being within the scope of the present invention, to provide a negative indication of compliance and a positive indication of non-compliance.

In an alternative aspect, also illustrated in FIG. 6, a determination of compliance of each investment vehicle contained within the illustrated long-term fund category in which assets subject to regulation are allocated or distributed can be determined. In this illustrative example, the balance of the deferred compensation is shown to be allocated or distributed among investment vehicles collected together in groups of equities entitled, large capital equities, small capital equities, international equities and peer group equities. Further, the funds, assets or monies are allocated or distributed such that a substantial portion of the deferred compensation is allocated to large capital equities. Also shown is the distribution of a supplemental retirement fund, which includes funds, assets or monies allocated among the same equity groups in approximately the same proportion. Using the previously recited exemplary compliance criteria, FIG. 6 thus illustrates that the value of assets within the large capital equity group is not in compliance with imposed regulations as the current value of obligations owed is less than the value of funds, assets or monies in the same group. On the other hand, the small capital equity group is found to be in compliance with the aforementioned compliance criteria as the value of equity assets is less than that of the value of the obligation owed. Thus, in accordance with the principles of this aspect of the invention, selected groups or subgroups of a portfolio may be individually determined to be within compliance of imposed regulations. As would be appreciated, groups or subgroups of stocks or equities may be selected over a number of different classes or types. For example, equities may be grouped according to company size, such as large-capital, small-capital, mid-capital, etc. Equities may also be grouped by company sector, such as technology sector, medical sector, defense sector, etc. Equities may be further grouped within sectors, such as chips, space, aerospace, etc.

Figure 7:
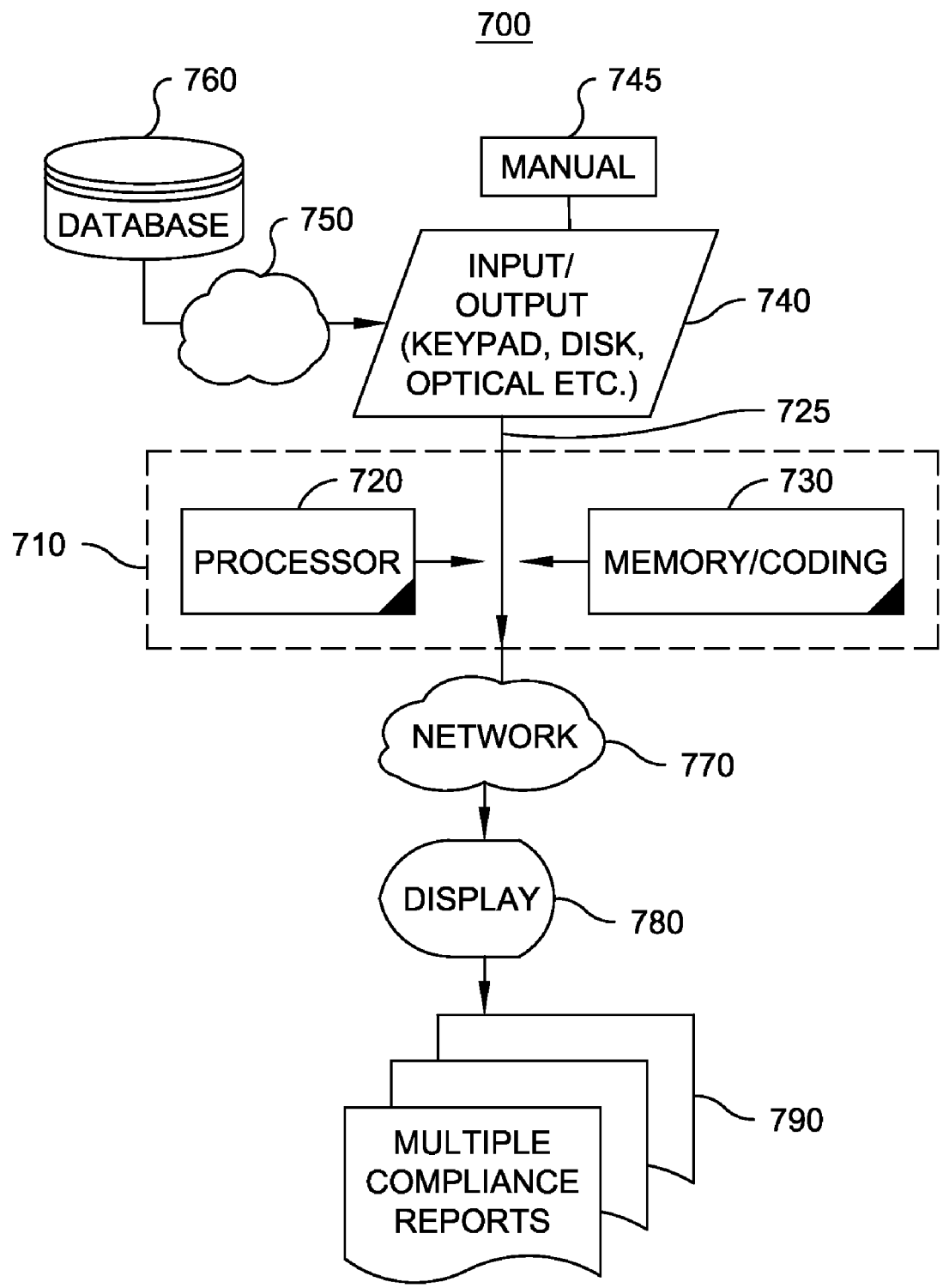
FIG. 7 illustrates a system operable to execute the exemplary processing illustrated in FIG. 5.

FIG. 7 illustrates an exemplary system 700 for practicing the principles of the invention. In this exemplary system embodiment, input data is received over network 750 and is processed in accordance with one or more software programs executed by processing system 710. The results of processing system 710 may then be transmitted over network 770 for viewing on display 780 and reporting, for example, on a printer, at 790.

As illustrated, system 700 may receive or transmit data over one or more network connections 750, 770 from a server or servers over, e.g., a global computer communications network such as the Internet, Intranet, a wide area network (WAN), a metropolitan area network (MAN), a local area network (LAN), a terrestrial broadcast system, a cable network, a satellite network, a wireless network, or a telephone network (POTS), as well as portions or combinations of these and other types of networks. As will be appreciated, network connections 750 and 770 may also be an internal network, e.g., ISA bus, microchannel bus, PCI bus, PCMCIA bus, etc., or one or more internal connections of a circuit, circuit card or other devices, as well as portions and combinations of these and other communication media or external networks, e.g., the Internet or an Intranet.

More specifically, one or more input/output devices 740 receive data from the illustrated database 760 over network 750 and the received data is applied to processing system 710. Processing system 710 comprises processor 720, which is in communication with input/output device 740 and memory 730. Input/output devices 740, processor 720 and memory 730 may communicate over a communication medium 725. The communication medium 725 may represent, for example, an ISA, PCI, PCMCIA bus, a communication network, one or more internal connections of a circuit, circuit card or other device, as well as portions and combinations of these and other communication media. Processor 720 may be representative of a handheld calculator, special purpose or general purpose processing system, desktop computer, laptop computer, palm computer, or personal digital assistant (PDA) device etc., as well as portions or combinations of these and other devices that can perform the operations illustrated in FIG. 4. Processor 720 may include code, which when executed, performs the operations illustrated in FIG. 4. The code may be contained in memory 730 or read/downloaded from a memory medium such as a CD-ROM or floppy disk (not shown), which is accessible by processor 720, when needed. The operations illustrated in FIG. 4 may be performed sequentially or in parallel using different processors to determine specific values. Further, the data received by input/output device 740 may be immediately accessible by processor 720 or may be stored in memory 730. As will be appreciated, input/output device 740 may also allow for manual input, such as a keyboard or keypad entry or may read data from magnetic or optical medium.

In other embodiments, hardware circuitry may be used in place of, or in combination with, software instructions to implement the invention. For example, the elements illustrated herein may also be implemented as discrete hardware elements or may be integrated into a single unit.

While there has been shown, described, and pointed out, fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated.

What is claimed is:

1. A computer system for determining compliance with a predetermined relation imposed by banking regulations between liability balances and balances of equity assets held in accounts for hedging the liability balances, comprising:
   a memory device;
   a processor in communication with the memory device, said processor configured to:
   determine and store in the memory device a liability balance associated with allocations of deferred funds in equity investments;
   determine and store in the memory device a value of equity assets held in an account for hedging the liability balance exclusive of equity assets held in life insurance policies;
   determine and store in the memory device a value of equity assets in one or more life insurance policies held in the account;
   sum the value of the equity assets held in the account exclusive of equity assets held in life insurance policies and the value of the equity assets in the one or more life insurance policies to determine an equity asset balance associated with the account;
   determine a relation between the equity asset balance and the liability balance;
   compare the determined relation between the equity asset balance and the liability balance with the predetermined relation imposed by banking regulations to determine whether the determined equity asset balance is in compliance with the predetermined relation;
   provide, to a communication network, an output signal having data indicative of instructions to divest a portion of the equity assets from the account when the determined equity asset balance is not in compliance with the predetermined relation until the equity asset balance is in compliance with the predetermined relation; and
   provide, to the communication network, responsive to determining that the determined equity asset balance is in compliance with the predetermined relation, an output signal having data indicative of compliance of the equity asset balance with the predetermined relation.

2. The system as recited in claim 1, wherein the processor is further configured to, in determining the value of the equity assets exclusive of equity assets held in life insurance policies, add balances of values of the equity assets within investment categories; and add corresponding investment gains and/or losses to the added balances.

3. The system as recited in claim 1, wherein the processor is further configured to, in determining the value of the equity assets held in life insurance policies, add balances of equity assets within investment categories.

4. The system as recited in claim 1, wherein the processor is further configured to:
   in determining a liability balance, determine a liability balance in each one of a plurality of investment categories;
   in determining a value of equity assets exclusive of equity assets held in life insurance policies, determine a value in each one of the plurality of investment categories;
   in determining a value of equity assets in one or more life insurance policies held in the account, determine a value in each one of the plurality of investment categories; and
   in summing, determine an equity asset balance in each of the investment categories.

5. The system as recited in claim 4, wherein the data indicative of instructions to divest comprises data indicative of instructions to divest the equity assets in one or more of the investment categories when the equity asset balance in one of the investment categories is not in compliance with the predetermined relation.

6. The system as recited in claim 4, wherein the investment categories comprise at least one of large capital equities, small capital equities and international equities.

7. The system as recited in claim 1, wherein the equity asset balance is in compliance with the predetermined relation when the equity asset balance is less than the liability balance.

8. A computer-implemented method for determining compliance with a predetermined relation imposed by banking regulations between liability balances and balances of equity assets held in accounts for hedging the liability balances, comprising:

determining and storing in a memory by a processor a liability balance associated with allocations of deferred funds in equity investments;

determining and storing in the memory by the processor a value of equity assets held in an account for hedging the liability balance exclusive of equity assets held in life insurance policies, the determining comprising accessing a portfolio manager database via a communications network;

determining and storing in the memory by the processor a value of equity assets in one or more life insurance policies held in the account, the determining comprising accessing the portfolio manager database via the communications network;

summing by the processor the value of the equity assets held in the account exclusive of equity assets held in life insurance policies and the value of the equity assets in the one or more life insurance policies to determine an equity asset balance associated with the account;

determining by the processor a relation between the equity asset balance and the liability balance;

comparing by the processor the determined relation between the equity asset balance and the liability balance with the predetermined relation imposed by banking regulations to determine whether the determined equity asset balance is in compliance with the predetermined relation;

providing by the processor to a computer network for transmission to a portfolio manager an output signal having data indicative of an instruction to the portfolio manager to divest a portion of the equity assets from the account when the determined equity asset balance is not in compliance with the predetermined relation until the equity asset balance is in compliance with the predetermined relation; and providing by the processor to the computer network an output signal for generation of a compliance report for informing a plan sponsor of compliance of the equity asset balance with the predetermined relation when the determined equity asset balance is determined to be in compliance with the predetermined relation.

9. The method as recited in claim 8 wherein the determining the value of the equity assets exclusive of equity assets held in life insurance policies comprises adding by the processor balances of values of equity assets within investment categories; and
adding by the processor corresponding investment gains and/or losses to the added balances.

10. The method as recited in claim 8 wherein the determining the value of the equity assets held in life insurance policies comprises adding by the processor balances of equity assets within investment categories.

11. The method as recited in claim 8 wherein:
the determining a liability balance comprises determining a liability balance in each one of a plurality of investment categories;
the determining a value of equity assets exclusive of equity assets held in life insurance policies comprises determining a value of equity assets exclusive of equity assets held in life insurance policies in each one of the plurality of investment categories;
the determining a value of equity assets in one or more life insurance policies held in the account comprises determining a value of equity assets in each one of the plurality of investment categories; and
the summing comprises summing, in each one of the plurality of investment categories, the value of the equity assets held in the account exclusive of equity assets held in life insurance policies and the value of the equity assets in the one or more life insurance policies to determine an equity asset balance associated with the account in each of the investment categories.

12. The method as recited in claim 11, wherein the providing by the processor an output signal having data indicative of an instruction to divest comprises providing by the processor an output signal having data indicative of an instruction to divest the equity assets in one or more of the investment categories when the equity asset balance in one of the investment categories is not in compliance with the predetermined relation.

13. The method as recited in claim 11, wherein the investment categories comprise at least one of large capital equities, small capital equities and international equities.

14. The method of claim 1, wherein the equity asset balance is in compliance with the predetermined relation when the equity asset balance is less than the liability balance.

15. A non-transitory computer-readable medium for determining compliance with a predetermined relation imposed by banking regulations between liability balances and balances of equity assets held in accounts for hedging the liability balances comprising code, which code, when executed by a processor, causes the processor to:
determine a liability balance associated with allocations of deferred funds in equity investments;
determine a value of equity assets held in an account for hedging the liability balance exclusive of equity assets held in life insurance policies;
determine a value of equity assets in one or more life insurance policies held in the account;
sum the value of the equity assets held in the account exclusive of equity assets held in life insurance policies and the value of the equity assets in the one or more life insurance policies to determine an equity asset balance associated with the account;
determine a relation between the equity asset balance and the liability balance;
compare the determined relation between the equity asset balance and the liability balance with the predetermined relation imposed by banking regulations to determine whether the equity asset balance is in compliance with the predetermined relation;
provide an output signal having data indicative of an instruction to divest a portion of the equity assets from the account when the determined equity asset balance is not in compliance with the predetermined relation until the equity asset balance is in compliance with the predetermined relation; and
provide an output signal having data indicative of compliance of the equity asset balance with the predetermined relation when the determined equity asset balance is determined to be in compliance with the predetermined relation.

16. The non-transitory computer-readable medium as recited in claim 15, wherein the code further causes the processor to, in determining the value of the equity assets exclusive of equity assets held in life insurance policies, add balances of values of the equity assets within investment categories and add corresponding investment gains and/or losses to the added balances.

17. The non-transitory computer-readable medium as recited in claim 15, wherein the code further causes the processor, in determining the value of the equity assets held in life insurance policies, to add balances of equity assets within investment categories.

18. The non-transitory computer-readable medium as recited in claim 15, wherein the code further causes the processor to:
- in determining a liability balance, determine a liability balance in each one of a plurality of investment categories;
- in determining a value of equity assets exclusive of equity assets held in life insurance policies, determine a value in each one of the plurality of investment categories;
- in determining a value of equity assets in one or more life insurance policies held in the account, determine a value of equity assets in each one of the plurality of investment categories; and
- in summing, sum, in each one of the plurality of investment categories, the value of the equity assets held in the account exclusive of equity assets held in life insurance policies and the value of the equity assets in the one or more life insurance policies, to determine an equity asset balance associated with the account in each one of the plurality of investment categories.

19. The non-transitory computer-readable medium as recited in claim 18, wherein the code further causes the processor to, in determining whether the equity asset balance is in compliance with the predetermined relation, determine whether the equity asset balance in each one of the investment categories is in compliance with the predetermined relation.

20. The non-transitory computer-readable medium as recited in claim 18, wherein the investment categories comprise at least one of large capital equities, small capital equities and international equities.

21. The non-transitory computer-readable medium as recited in claim 15, wherein the equity asset balance is in compliance with the predetermined relation when the equity asset balance is less than the liability balance.

* * * * *